Nov. 5, 1968  B. H. SOFFER  3,409,819
INTERNAL LASER HARMONIC GENERATOR WITH FREQUENCY
SEPARATING PRISM OUTPUT COUPLER
Filed Jan. 22, 1965
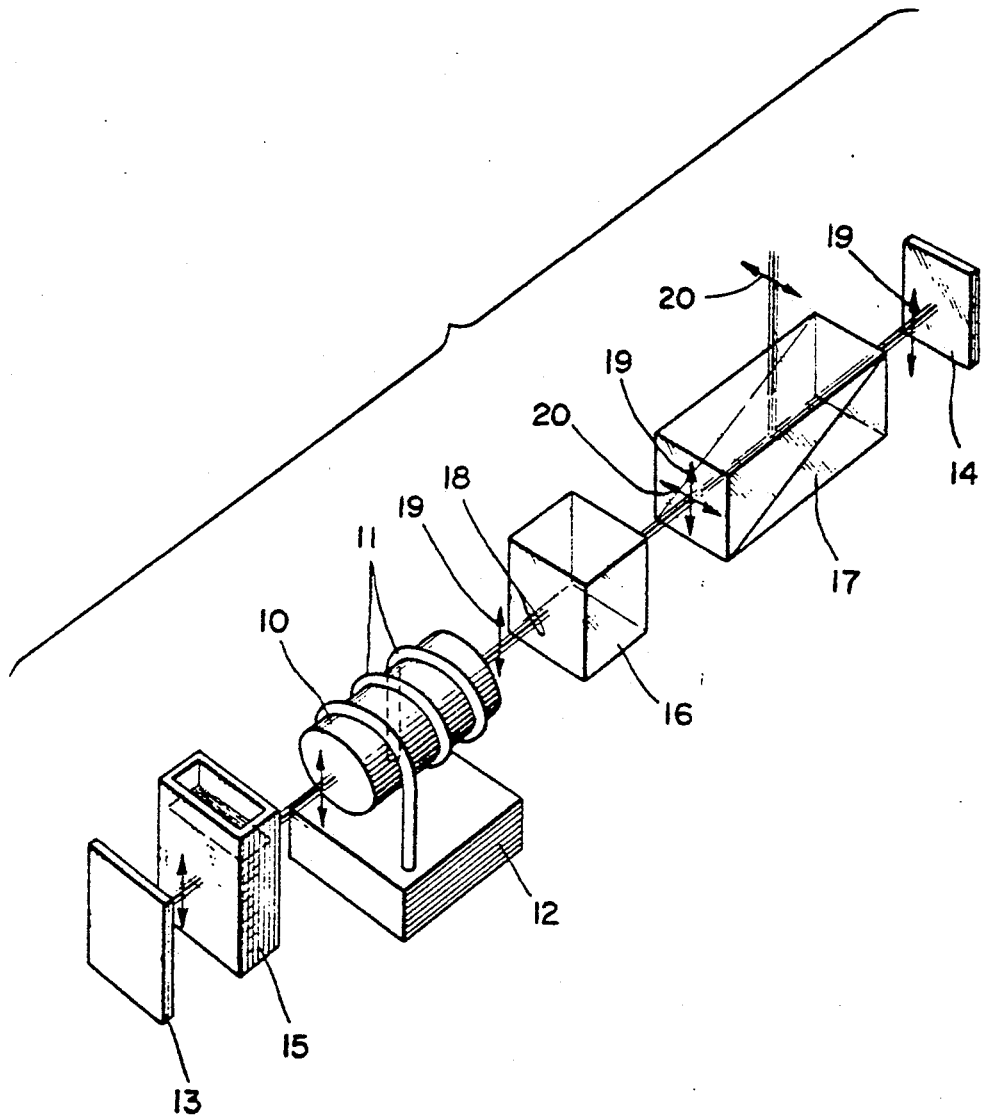
INVENTOR.
BERNARD H. SOFFER
BY
Elliott & Pastoriza
ATTORNEYS 3,409,819
INTERNAL LASER HARMONIC GENERATOR
WITH FREQUENCY SEPARATING PRISM
OUTPUT COUPLER
Bernard H. Soffer, Northridge, Calif., assignor to Union
Carbide Corporation, a corporation of New York
Filed Jan. 22, 1965, Ser. No. 427,448
5 Claims. (Cl. 321—69)

ABSTRACT OF THE DISCLOSURE

The disclosure contemplates a method and apparatus for generating a harmonic of laser light by employing one hundred percent reflecting end mirrors to provide a very high Q laser cavity together with a non-linear dielectric medium disposed in the cavity to generate the desired harmonic. The fundamental and harmonic are orthogonally polarized with respect to each other and passed through a polarizing prism to deflect the generated harmonic out of the optical cavity, the fundamental light simply passing through the prism between the end mirrors.

This invention relates generally to laser systems and more particularly, to a novel method and apparatus for generating optical harmonics of a given laser light.

Generation of optical harmonics from a laser beam has been accomplished heretofore. The harmonic generation is effected, generally, in a transparent non-linear dielectric medium such as a potassium dihydrogen phosphate (KDP) crystal or an ammonium dihydrogen phosphate (ADP) crystal, by way of examples. The dielectric crystal is disposed externally of the laser system in a position to intercept the generated laser light beam and generate the desired harmonic.

The efficiency of harmonic generation increases with increased light intensity incident on the dielectric crystal. As a consequence, it is desirable to provide a very high intensity beam in the laser system preferably incorporating Q-spoiling means to enable the generation of giant laser pulses for irradiating the particular dielectric crystal involved. Since the laser light must be coupled out of the optical cavity, one of the end mirrors must be designed to be only partially reflective or otherwise provided with a small opening. Consequently, the intensity of the beam is not as high as could be realized within the cavity if the end mirrors could be made 100% reflecting.

In addition to the above, the high laser fields employed in the generation of harmonics are generally concentrated at the focus of a lens external to the laser cavity. The focussing of the beam at such a point can seriously damage the harmonic generating crystal.

Many of the foregoing problems can be overcome if the dielectric crystal for generating the optical harmonic could be disposed directly in the optical cavity of the laser system. In this event, however, it would appear necessary to design one of the end mirrors to be simultaneously opaque at the fundamental laser light frequency and transparent at the harmonic frequency in order to couple the harmonic frequency out of the system. It is very difficult to materialize mirrors in this manner and still retain a high Q cavity.

With the foregoing considerations in mind, it is, accordingly, a primary object of this invention to provide a novel method and apparatus for generating optical harmonics in which an extremely high Q laser optical cavity may be employed without requiring special treatment of the end mirrors for separating the generated harmonic, all to the end that a very high intensity fundamental light may be used to generate the optical harmonic with the desirable attendant increase in efficiency.

More particularly, it is an object to provide a method and apparatus for generating optical harmonics with laser light in which the risk of any damage of the incident light on the harmonic generating dielectric crystal is minimized.

Another object is to provide a method and apparatus for generating optical harmonics in a laser system in which the generated harmonic is completely separated from the fundamental.

Briefly, the method of the invention contemplates the steps of generating a laser light beam within an optical cavity employing 100% reflecting end mirrors to provide a very high Q cavity. The generated beam of light is then passed through a non-linear dielectric medium disposed within the optical cavity to generate a harmonic of the fundamental light frequency. The design and arrangement is such that the fundamental and harmonic are orthogonally polarized with respect to each other. In accordance with further steps of the method, the fundamental and harmonic are then passed through a polarizing prism which is responsive to polarized light in a given direction to deflect the light out of the optical cavity. The deflected light constitutes the generated harmonic, the fundamental light simply passing through the prism between the end mirrors.

A preferred apparatus for carrying out the method includes a giant pulse laser system with 100% reflecting end mirrors to provide the desired high Q optical cavity. Suitable Q-spoiling means are incorporated in the optical cavity to enable the generation of giant laser pulses. A frequency multiplying non-linear dielectric medium, in turn, is disposed in the optical cavity to intercept the generated giant laser pulses. This non-linear dielectric provides an optical harmonic that is polarized orthogonally to the originally polarized laser light. The structure is completed by the provision of a suitable polarizing prism which functions to separate the harmonic from the fundamental light, the prism being responsive to radiation polarized in the direction of the harmonic light to deflect the same out of the optical cavity.

There is thus provided a system for generating optical harmonics wherein the generated harmonic itself is free of the fundamental light and in which it is possible to dispose the non-linear dielectric medium for generating the optical harmonic within the optical cavity of the laser system. As a consequence, the various disadvantages resulting from externally disposed optical harmonics generators are avoided.

A better understanding of the method and apparatus of this invention will be had by now referring to a preferred embodiment thereof, as illustrated in the accompanying drawing, in which:

The single figure is a perspective view illustrating the basic components making up one embodiment of the optical harmonic generator of the invention.

Referring to the drawing, there is illustrated a laser material 10 which may constitute a ruby rod surrounded by a helical flash lamp 11 energized from a light source 12. Suitable end mirrors 13 and 14 are disposed on either side of the laser material 10 to define an optical cavity. In accordance with a feature of this invention each of the end mirrors 13 and 14 is made substantially 100% reflecting so that a very high Q optical cavity results.

As shown in the drawing, there is also provided a Q-spoiler in the form of a passive structure 15. By way of example, the passive Q-spoiler may constitute a solution of cryptocyanine which is substantially opaque to spoil the Q of the cavity until such time an incident radiation thereon renders the solution suddenly transparent thereby restoring the cavity Q and enabling the generation of giant laser pulses. An example of such a Q-spoiling arrangement is fully shown and described in co-pending patent application Serial No. 364,169 filed May 1, 1964 for Light Control Means for Use With a Giant Pulse Laser.

A non-linear dielectric medium such as a potassium dihydrogen phosphate crystal 16 is disposed in the optical cavity between the mirrors 13 and 14 in a position to intercept laser light from the laser rod 10. In the case of potassium dihydrogen phosphate crystal, a first harmonic or doubled frequency output of laser light is generated. A polarizing prism such as a Glan prism 17 is disposed between the crystal 16 and end mirror 14 and positioned to effect a separation of the fundamental laser light and the generated doubled frequency light or harmonic.

To realize high efficiency of harmonic generation, the phase velocity of the fundamental or generating light beam and the harmonic or generated light beam should be matched over a length at least as long as the coherent path length of the laser rod. One effective manner of achieving this result is to utilize the birefringent nature of the potassium dihydrogen phosphate crystal and choose a direction in the crystal for which the two indices of refraction for the fundamental and harmonic frequencies are equal. In all materials known at the present time, this condition entails that the two beams be polarized orthogonally. In the case of a potassium dihydrogen phosphate crystal used as a frequency doubler, the "ordinary" polarization of ruby laser light produces in the KDP crystal an orthogonal or "extraordinary" polarization for the doubled light.

In accordance with a further important feature of the present invention, advantage is taken of the orthogonal polarization of the respective beams by means of the Glan prism 17 to remove the harmonic. Since the generated harmonic is directed laterally from the optical path in the laser cavity defined by the end mirrors 13 and 14, it is possible to provide the end mirrors 13 and 14 with a substantially 100% reflecting surface to yield a very high cavity Q.

The fields in the cavity are thereby very high and since the efficiency of the non-linear harmonic geenration process monotonically increases with the strength of the fundamental light or field, the efficiency is improved.

By way of example of a specific operation of the harmonic generator described in FIGURE 1, and carried out experimentally, the ruby rod 10 was approximately 3 inches long and provided a fundamental light wave length of 6943 A. The end mirrors, in turn, were coated with a suitable dielectric to be extremely reflective (99% at the ruby fundamental wave length of 6943 A.). With this arrangement, the fundamental light beam, indicated at 18 from the ruby rod 10, was polarized in a first direction indicated by the vertical arrows 19, and when passed through the doubling potassium dihydrogen phosphate crystal 16, resulted in the generation of an optical harmonic polarized in a second direction as indicated by the horizontal arrows 20. The KDP crystal 16 was cut at a matching angle to the Glan prism 17, and the orthogonally polarized beams in passing through the Glan polarizing prism then resulted in the harmonic light being deflected from the cavity, as indicated at 20, with the vertically polarized fundamental light passing through the prism to the end mirror 14 and traversing back again in the normal manner. Using giant pulses generated with the three inch ruby rod, doubling efficiences of the order of 1% were obtained.

Other analogous arrangements using the different variations of polarizing prisms such as the "Rochon" and right angle "Rochon" used as a chisel reflector could also work well.

From the foregoing description, it will be evident that the method and apparatus of this invention have enabled the generation of an optical harmonic to be effected by disposing the harmonic generator directly in the laser optical cavity, advantage being taken of the orthogonal polarization of the fundamental and harmonic beams to effect separation.

While only one particular embodiment of the invention has been set forth and described, variations that fall within the scope and spirit of the invention will occur to those skilled in the art. The method and apparatus for generating optical harmonics with laser light are therefore not to be thought of as limited to the one example set forth merely for illustrative purposes.

What is claimed is:

1. A method of generating an optical harmonic of laser light within a laser optical cavity comprising the steps of: polarizing said light in a first direction; passing said light through a non-linear dielectric medium in said optical cavity to generate an harmonic thereof polarized in a second direction; and passing said light and harmonic into a polarizing prism in said optical cavity adapted to pass light polarized in said first direction and deflect light from said optical cavity polarized in said second direction to thereby separate said harmonic of said laser light.

2. A method of generating an optical harmonic of laser light comprising the steps of: providing substantially 100% reflecting end mirrors spaced along an optical path in opposed relationship to define an optical cavity; generating a laser beam in said optical cavity by effecting stimulated emission by said end mirrors in a laser material disposed between said end mirrors, said beam being polarized in a first direction; passing said beam through a non-linear dielectric material positioned in said optical cavity to provide a harmonic of said beam polarized in a second direction orthogonal to said first direction; and passing said beam and harmonic of said beam into a polarizing prism disposed in said optical cavity between said dielectric material and one of said end mirrors, said polarizing prism passing light polarized in said first direction along said path and deflecting light polarized in said second direction laterally from said path whereby said harmonic of said beam is separated from said beam.

3. An apparatus for generating an optical harmonic of laser light comprising, in combination: laser means including an optical cavity for generating laser light; frequency multiplying means positioned in said cavity for providing a harmonic of said light, said light being polarized in a first direction and said harmonic being polarized in a second direction; and a polarizing means in said cavity positioned to intercept said light and harmonic thereof and deflect said harmonic only from said optical cavity.

4. An apparatus for generating an optical harmonic of laser light comprising, in combination: a laser material; substantially 100% reflecting end mirrors defining an optical cavity for said material; optical pumping means coupled to said material for effecting an inverted population level of laser ions in said material; Q-spoiling means disposed in said optical cavity for enabling the generation of giant laser pulses of light polarized in a first direction in said optical cavity; a non-linear dielectric medium disposed in said optical cavity to receive said light and provide a harmonic thereof polarized in a second direction; and a polarizing prism disposed in said optical cavity to intercept said light and harmonic thereof and deflect said harmonic only from said optical cavity.

5. An apparatus according to claim 4, in which said first direction is orthogonal to said second direction.

No references cited.

ROY LAKE, *Primary Examiner.*

D. R. HOSTETTER, *Assistant Examiner.*